D. DUNLOP AND J. D. DAVIS.

AUXILIARY AIR INTAKE FOR INTERNAL COMBUSTION ENGINES.

APPLICATION FILED FEB. 7, 1919.

Reissued July 26, 1921. 15,163.

Witness

Chas. L. Grieshauer.

Inventors

David Dunlop,

John D. Davis,

By Sheppard & Sheppard.

their Attorneys

UNITED STATES PATENT OFFICE.

DAVID DUNLOP AND JOHN D. DAVIS, OF PETERSBURG, VIRGINIA.

AUXILIARY AIR-INTAKE FOR INTERNAL-COMBUSTION ENGINES.

15,163. Specification of Reissued Letters Patent. Reissued July 26, 1921.

Original No. 1,280,193, dated October 1, 1918, Serial No. 176,134, filed June 21, 1917. Application for reissue filed February 7, 1919. Serial No. 275,673.

*To all whom it may concern:*

Be it known that we, DAVID DUNLOP and JOHN D. DAVIS, citizens of the United States, residing at Petersburg, in the county of Dinwiddie and State of Virginia, have invented new and useful Improvements in Auxiliary Air-Intakes for Internal-Combustion Engines, of which the following is a specification.

This invention is an auxiliary air intake for internal combustion engines, and among its important objects is to embody the invention in the form of an attachment capable of being conveniently fitted to an internal combustion engine, more particularly engines of this type for automobiles and motor trucks, without requiring any change or alteration in the engine other than the formation of an opening in the intake manifold to accommodate the valve part of the present invention.

The valve element of the present invention is thermostatically controlled in accordance with the heat of the engine, and is entirely independent of the usual carbureter, whereby the control of the auxiliary air supply is not only automatic but is wholly independent of the supply of the gaseous mixture furnished through the medium of the usual carbureter.

A still further object of the invention is to effectually prevent the suction of the engine from having any closing effect upon the valve of the auxiliary air intake, such as would produce "hunting" or fluttering of the valve, when the valve is open under the influence of the thermostatic element of the invention.

We deem it desirable to regulate the auxiliary supply of air to the engine directly in proportion to the change in temperature of the engine. Now, the change in a thermostatic element is not directly in accordance with the changes of temperature, and therefore means has been provided, under the control of the thermostatic element, for regulating the supply of air directly in accordance with changes in the temperature of the engine.

Another object of the invention is to insure the effective operation of the device notwithstanding the vibration of the engine, and also to prevent binding of the valve member under the suction influence of the engine.

With these and other objects in view, the present invention consists in the combination and arrangement of parts, as will be hereinafter more fully described, shown in the accompanying drawings, and particularly set forth in the appended claims, it being understood that changes in the form, proportion, size and minor details may be made, within the scope of the claims, without departing from the spirit or sacrificing any of the advantages of the invention.

In the accompanying drawings, the numeral 5 indicates an internal combustion engine of any conventional type, provided with the usual intake manifold 6 and the usual exhaust pipe 7.

Figure 1:
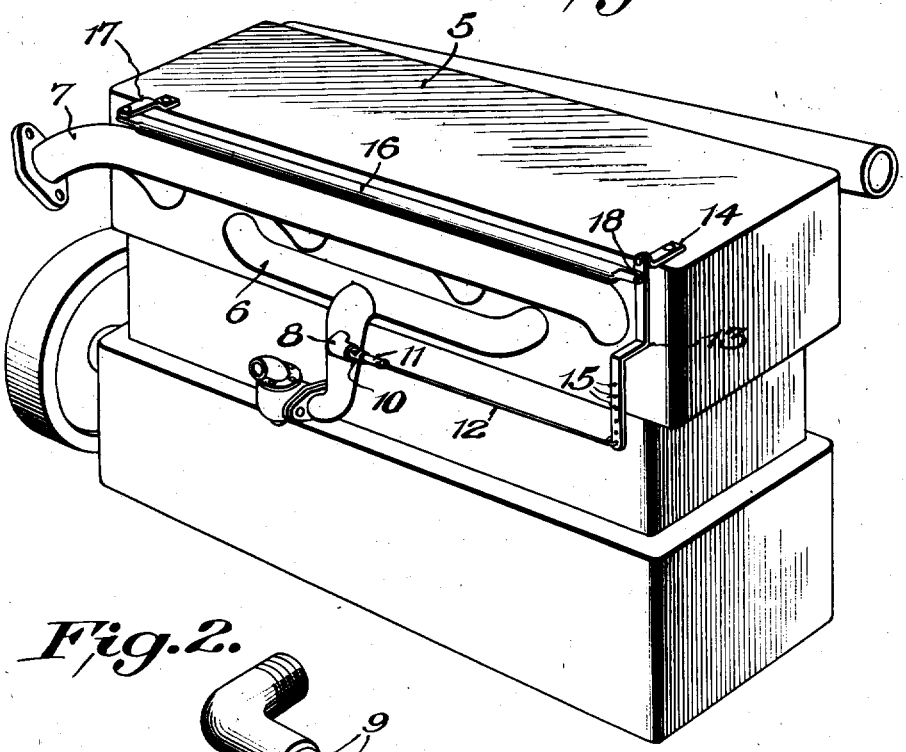
Figure 1 is a perspective view of a conventional type of internal combustion engine having the present invention applied thereto.
Figure 2:
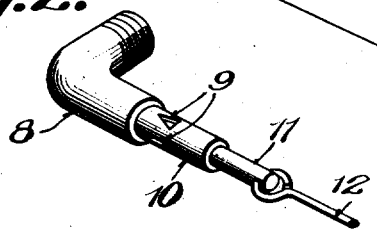
Fig. 2 is a perspective view of one embodiment of the valve mechanism.
Figure 5:
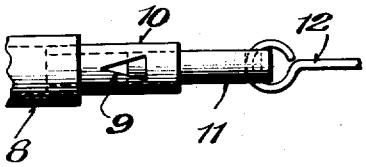
Fig. 5 is an enlarged detail view illustrating the shape of the inlet port of the valve casing and the relation thereto of the valve.
Figure 3:
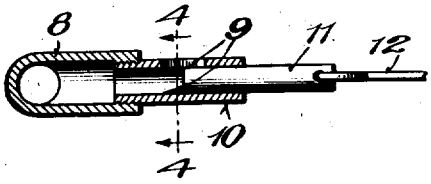
Fig. 3 is a longitudinal sectional view of Fig. 2.
Figure 4:
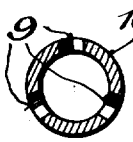
Fig. 4 is a cross-sectional view on the line 4—4 of Fig. 3.

A threaded opening is provided in the upright branch of the intake manifold for the reception of the valve casing 8, which, in the present embodiment of the invention, is in the form of a tubular elbow or L-shaped conduit, one arm of which is threaded as shown and screwed into the threaded opening in the intake manifold. The other arm of the elbow is provided with one or more inlet ports 9, which, according to the present embodiment, are located in a tubular extension 10, open at opposite ends and threaded or otherwise secured to the elbow 8. As best shown in Fig. 5 of the drawings, it will be seen that each inlet port 9 is triangular in shape, preferably in the form of an isosceles triangle, having the apex thereof extending in the direction of the inflow of air into the manifold. A suitable plug valve 11 has a working fit in the part 10 of the casing so as to work back and forth across the inlet ports 9. A connecting rod 12 extends from the outer end of the valve and is connected with the free end of a lever 13, the upper end of which is fulcrumed upon a bracket 14 suitably secured to the engine casing, preferably upon the top thereof. The lower portion of the lever is offset from the upper portion thereof, in order that said lower portion may be disposed in alinement with the valve, and the upper portion may lie adjacent the engine casing. The lower portion of the lever is provided with a plurality of perforations 15 with any one of which the outer extremity of the connecting rod 12 may be engaged so as to vary the movement of the valve 11, as will be readily understood. A suitable thermostatic element 16 is mounted adjacent the exhaust manifold 7 of the engine and in substantial parallelism therewith, one end portion being supported by a bracket 17 suitably secured to the engine casing, while the free end portion of the rod is pivoted as at 18 to the lever 13 adjacent the fulcrum thereof.

The parts of the present attachment are so disposed that the air inlet ports 9 are closed by the valve 11 at atmospheric temperature, in order that the engine may be started on the carbureter. As the engine becomes heated, while running, the thermostatic element 16 will expand or elongate and will therefore move the lever 13 outwardly, whereby the connecting rod 12 will move the valve 11 outwardly, thereby first uncovering the apex end of the air inlet port 9. By thus opening the air inlet port 9, auxiliary air will be admitted to the intake manifold between the carbureter and the engine cylinders, which will result in an increased speed of the engine without opening the throttle, thereby obtaining increased speed with the same amount of fuel. As the temperature of the engine increases, the thermostatic element 16 will continue to elongate but not directly in accordance with the increase in temperature of the engine. Inasmuch as opposite walls of the inlet port 9 diverge in the direction of the opening movement of the valve, said port increases in width from its inner end toward its outer end and therefore it is evident that the area of the inlet opening made available by the opening of the valve 11 will increase more rapidly than if the side walls of the inlet opening were parallel, the result of which is to materially increase the admission of auxiliary air to the engine, whereby the supply of auxiliary air is automatically controlled directly in accordance with the change in temperature and wholly independent of the carbureter and the throttle valve.

Should the increase in temperature be sufficient to pull the valve 11 entirely out of its casing, then the auxiliary supply of air would be too great, resulting in a poor mixture and a slowing down and probably stopping of the engine, thereby notifying the driver that the engine has become overheated, and giving him an opportunity to let the engine cool off and thus prevent damage to the engine by overheating. It will now be understood that the open end of the valve casing through which the valve 11 works is an auxiliary inlet port which is normally closed but which becomes open when the valve is pulled entirely out of the casing by the action of the thermostatic element 16 at a predetermined high temperature of the engine.

A further important advantage of the invention is the fact that the valve is positively held in any position to which it is moved by the thermostat, and therefore the suction of the engine has no closing effect upon the valve, and consequently the valve is positively maintained at all times in the position to which it has been adjusted by the thermostat.

While of course the valve is subject to the suction of the engine, the said suction has no binding effect upon the valve such as to interfere with the proper movement thereof by the thermostat, for the reason that the valve moves in an endwise direction and is not pulled into abnormal frictional engagement with the walls of the casing by the suction of the engine.

What we claim is:

1. The combination with an internal combustion engine having an intake manifold and an exhaust manifold, a valve casing communicating with the intake manifold, a reciprocatory valve for the casing, said casing being provided with an inlet port having opposite walls diverging in the direction of the opening movement of the valve, a thermostatic element mounted adjacent and in substantially parallelism with the exhaust manifold, and a lever fulcrumed in its upper portion upon the engine and connected at its lower portion with the valve, and also associated with the thermostatic element for movement thereby.

2. The combination with an internal combustion engine, of a substantially L-shaped valve casing having one arm communicating with the intake manifold of the engine, said valve casing being provided with an inlet port in the other arm thereof, a reciprocating plug valve working in said other arm of the casing and controlling the inlet port, a thermostatic element mounted in proximity to the exhaust manifold of the engine, and means controlled by the thermostatic element for moving the plug valve endwise in its casing.

3. The combination with an internal combustion engine, of an L-shaped air conduit in communication with the intake manifold thereof, said conduit being provided with a valve chamber having a plurality of triangularly shaped openings therein, the bases of said triangles lying in a common plane passed transversely through said chamber, a reciprocatory valve mounted within said chamber for opening and closing said openings, and a thermostat associated with the engine and having connection with said valve for actuating the same upon the rising or falling of temperature of the engine.

DAVID DUNLOP.
JOHN D. DAVIS.